Sept. 15, 1953
J. A. VAWTER
2,651,984
CULTIVATOR ATTACHMENT
Filed Aug. 22, 1949
2 Sheets-Sheet 1
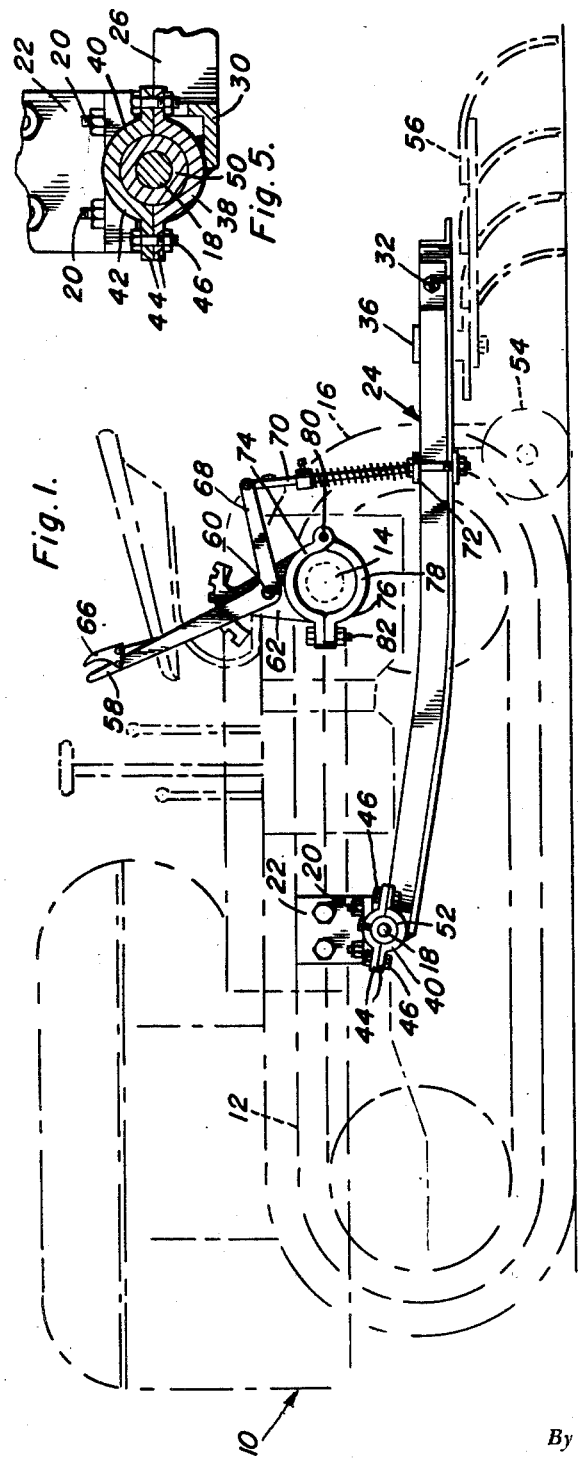
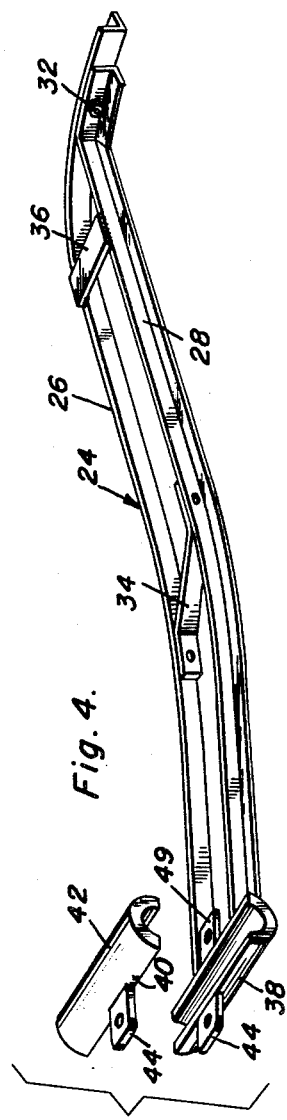
Inventor
James A. Vawter
By Clarence A. O'Brien
and Harvey B. Jacobson
Attorneys Sept. 15, 1953  J. A. VAWTER  2,651,984
CULTIVATOR ATTACHMENT
Filed Aug. 22, 1949  2 Sheets-Sheet 2
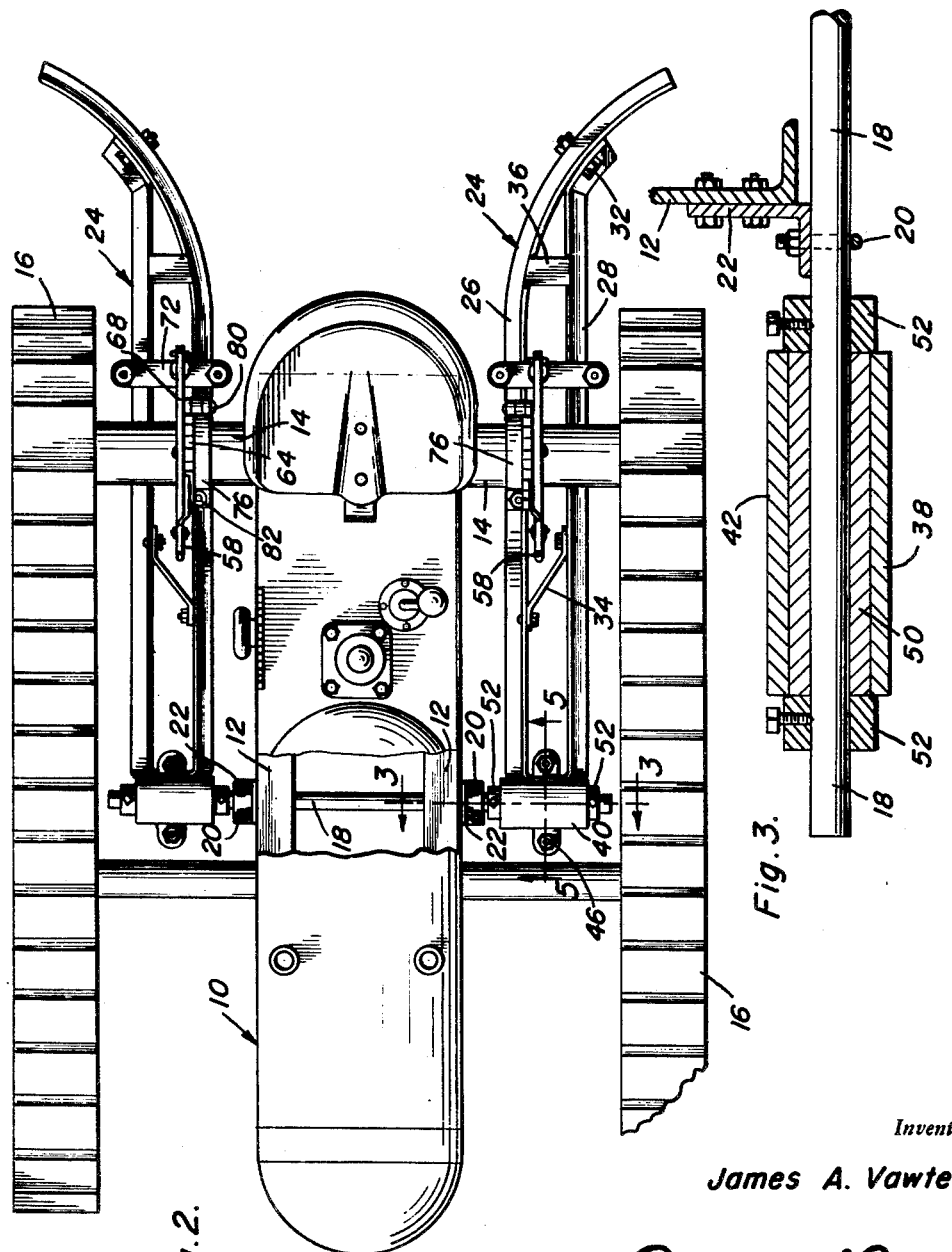
Inventor
James A. Vawter Patented Sept. 15, 1953

2,651,984

UNITED STATES PATENT OFFICE 2,651,984

CULTIVATOR ATTACHMENT

James A. Vawter, Milan, Tenn.

Application August 22, 1949, Serial No. 111,620

1 Claim. (Cl. 97—47.16)

This invention relates to new and useful improvements and structural refinements in cultivating attachments for tractors, and the principal object of the invention is to facilitate highly efficient and expeditious cultivating of soft ground.

In particular, the invention concerns itself with cultivating attachments for tractors which have been designed in the past and which, although quite satisfactory for use on relatively hard ground, could not be successfully employed on soft soil, primarily because the wheels of the tractor to which the attachment was applied sank into the soil and prevented the cultivating attachment from maintaining a constant operating depth. Efforts were made to eliminate this disadvantage in the past by providing attachments for use with so-called endless track type tractors, in which instance the cultivating attachment was mounted forwardly of the tractor and supported by wheels, so that, in effect, while the endless tracks of the tractor did not sink into the soil, the travelling wheels of the cultivating attachment did, and the inability of the cultivator to maintain a constant operating depth was not corrected.

The instant invention, therefore, eliminates this disadvantage by providing an attachment for an endless track type tractor, which attachment is supported entirely by the tractor and, therefore, is capable of maintaining constant, predetermined depth while the endless tracks of the tractor itself prevent the entire apparatus from sinking in soft soil.

The primary feature of the invention, therefore, resides in the provision of the attachment including one or more supporting members for cultivating tools or other implements, while another feature lies in the provision of means for adjustably and removably mounting the implement-carrying members on the tractor.

Some of the advantages of the invention reside in its simplicity of construction, in its convenient, accurate and dependable operation, and in its adaptability for use with endless track type tractors of different types.

With the above more important objects and features in view and such other objects and features as may become apparent as this specification proceeds, the invention consists essentially in the arrangement and construction of parts as illustrated in the accompanying drawings, in which:

Figure 1 is a side elevational view of the invention applied to an endless track type tractor, the latter being shown by dotted lines;

Figure 2 is a top plan view of the invention on the tractor, the latter being shown by solid lines;

Figure 3 is a fragmentary cross-sectional detail, taken substantially in the plane of the line 3—3 in Figure 2;

Figure 4 is a group perspective view of one of the implement carrying members; and Figure 5 is a cross-sectional detail, taken substantially in the plane of the line 5—5 in Figure 2.

Like characters of reference are employed to designate like parts in the specification and throughout the several views.

Referring now to the accompanying drawings in detail, the general reference character 10 designates a conventional endless track type tractor including a frame or chassis 12, a laterally projecting rear axle housing 14, and a pair of endless tracks 16 which are supported by the housing 14 in spaced relation to the sides of the frame 12, as is best shown in Figure 2.

The invention is embodied in a cultivator attachment for the tractor 10, this attachment consisting of a transverse shaft 18 which is rigidly secured by U-shaped clamps 20 to angle brackets 22 provided on the side members 12 of the tractor frame, it being noted that end portions of the shaft 18 project laterally from the tractor frame, as illustrated in Figure 2.

A pair of cultivating implement-carrying members designated generally by the reference character 24 are supported by the end portions of the shaft 18, the members 24 being disposed between the frame 12 and the tracks 16, and since they are similar in construction, it is believed that a description of one will suffice for both.

Each of the members 24 consists of an angle bar which is angulated so as to provide a pair of spaced side pieces 26, 28 connected together by a cross-piece or portion 30, while the free end portions of the angle bar are secured together as at 32.

The side pieces 26, 28 are reinforced intermediate the ends thereof by suitable braces 34, 36, and the cross-piece or portion 30 is rigidly secured by welding, or the like, to a half section 38 of a tubular sleeve 40 which also includes a complementary half section 42 as is best illustrated in Figure 4.

The collar or sleeve sections 38, 42 are provided with laterally projecting lugs 44 to accommodate suitable screws 46, whereby the sleeve sections may be securely clamped upon a tubular bushing 50 which is rotatably mounted on an end portion of the aforementioned shaft 18 between a pair of collars 52.

By virtue of this arrangement, the two members 24 are adjustably, swingably and removably mounted on the shaft 18, that is to say, by simply separating the sleeve sections 38, 42, the members 24 may be removed from the tractor when the use of the attachment is not desired, this being possible without the necessity of removing the shaft 18 and the brackets 22. Moreover, by simply adjusting the position of the collars 52 on the shaft 18, the transverse distance between the two members 24 may be increased or decreased as desired, and finally, while the sleeve sections 38, 42 are tightly clamped on the bushings 50, the bushings are rotatable on the shaft 18, so that the members 24 may be independently lowered or raised. The raising and lowering of the members is accomplished by means hereinafter more fully described.

It may be stated at this point that the purpose of the bushings 50 is to provide rotatable or swingable attachment of the members 24 to the shaft 18 without lateral play such as would result if the sleeve sections 38, 42 were clamped against each other around the shaft 18 with sufficient clearance to facilitate rotatability.

In any event, it is to be noted that the members 24, that is, the side pieces 26, 28 of the members 24, are slightly arcuated, so that their forward portions extend downwardly and rearwardly from the shaft 18, while their rear end portions are substantially horizontal in order that suitable cultivating tools may be mounted thereon as exemplified at 54, 56 in Figure 1.

The means for independently raising and lowering the two members 24 simply comprise a pair of hand levers 58, pivoted as at 60 to suitable brackets 62, the latter being provided with toothed quadrants 64 for engagement by a conventional latch mechanism 66 on the levers, while the levers themselves are formed integrally with cranks 68 operatively connected by conventional spring-pressed rods 70 to suitable straps 72 clamped to intermediate portions of the members 24, as will be clearly apparent. By virtue of this arrangement, the operating depth of the cultivating tools 54, 56 may be maintained at a constant, predetermined level.

The brackets 62 are provided on sections 74 of annular clamps 76 (see Figure 1) which also include complemental sections 78, the clamp sections 74, 78 being hinged together, as at 80, and being provided with suitable clamping screws 82 whereby the clamps 76 may be removably secured to the aforementioned rear axle housing 14.

It is believed that the advantages and use of the invention will be clearly apparent from the foregoing disclosure and, accordingly, further description thereof at this point is deemed unnecessary.

Having described the invention, what is claimed as new is:

An agricultural machine comprising a tractor including a frame supported by traction means spaced on opposite sides of the frame, a transverse shaft secured to the frame and having its opposite end portions projecting into the spaces between the frame and the traction means, a pair of tubular bearing bushings rotatably journaled on and longitudinally slidable on said portions, a pair of spaced collars adjustably secured to each end portion with the associated bushing being retained therebetween, a pair of implement support arms, means for detachably securing the arms to the bearing bushings, said means comprising a pair of sleeves each having complemental clamping sections, each of the arms being attached to a section of one of the pair of sleeves, means for clamping the complemental sections of the pair of sleeves about the pair of tubular bushings, said arms projecting rearwardly of the shaft in the spaces between the frame and the traction means and being adapted to support implements at their rear ends, and means carried by the frame for adjustably supporting the arms.

JAMES A. VAWTER.

References Cited in the file of this patent

UNITED STATES PATENTS

| Number | Name | Date |
|---|---|---|
| 783,874 | Lentz | Feb. 28, 1905 |
| 1,397,748 | Towner | Nov. 22, 1921 |
| 1,404,544 | Rettig | Jan. 24, 1922 |
| 1,656,773 | Burnett | Jan. 17, 1928 |
| 1,768,019 | Abeling et al. | June 24, 1930 |
| 2,335,175 | Davenport | Nov. 23, 1943 |